Dec. 13, 1966     J. PUCCI ETAL     3,290,853
METAL EXTRUSION
Filed Dec. 9, 1963
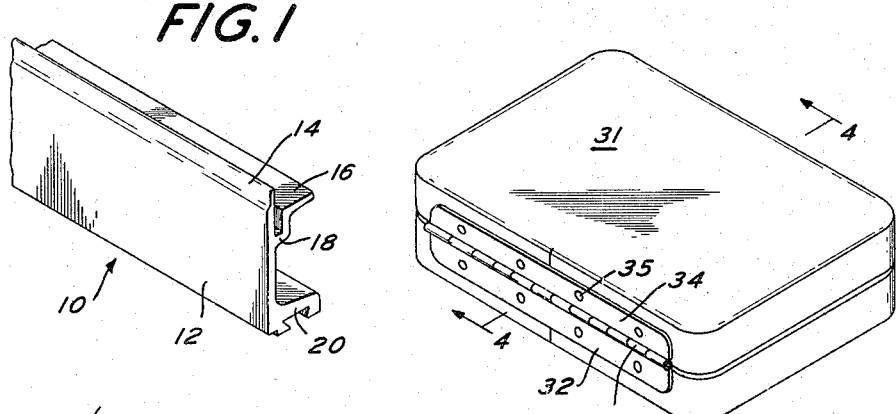
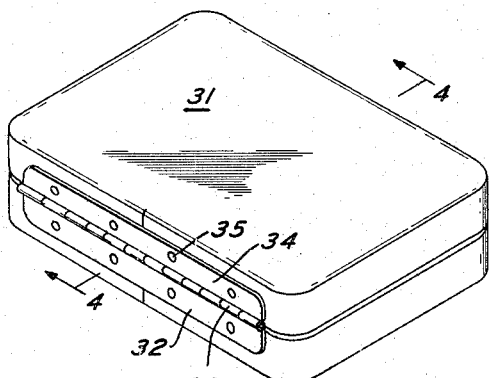
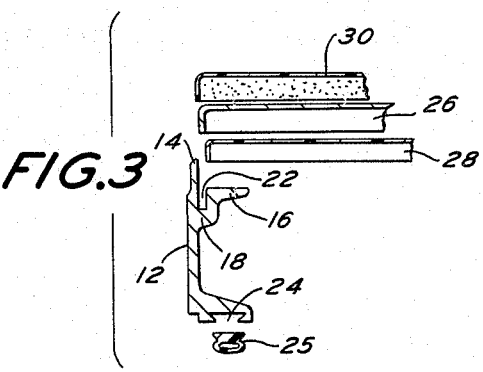
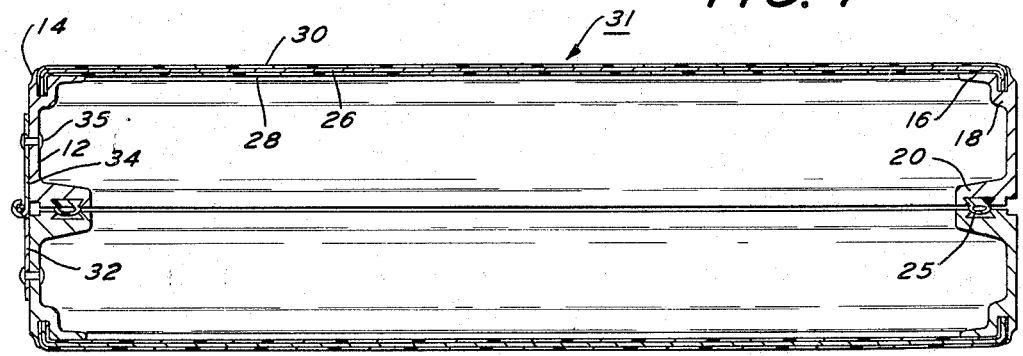
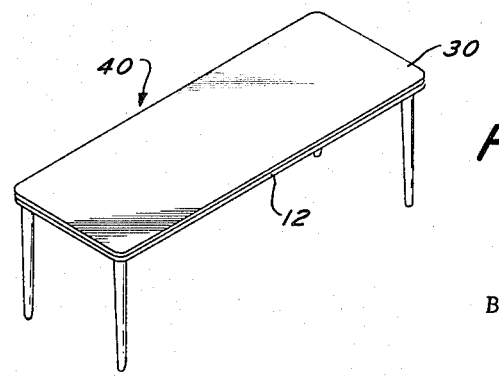
INVENTORS.
JOSEPH PUCCI
THOMAS J. RYAN
BY
Arthur H. Seidel
ATTORNEY

United States Patent Office 3,290,853
Patented Dec. 13, 1966

3,290,853
METAL EXTRUSION
Joseph Pucci, 443 E. Wadsworth St., and Thomas J. Ryan,
426 E. Allens Lane, both of Philadelphia, Pa.
Filed Dec. 9, 1963, Ser. No. 329,147
2 Claims. (Cl. 52—730)

This invention primarily relates to a novel metal extrusion and the method of using the extrusion in quickly and efficiently assembling various articles of manufacture.

The present invention contemplates the formation of many articles of manufacture in a simple and efficient manner. In brief, the invention comprises the formation of a metal extrusion having a slot and a flange forming a continuation of a wall of the slot. The extrusion can be bent into any shape corresponding to the geometrical configuration of the desired end product to be formed. A plate of sheet material having a transversely extending lip about its periphery and corresponding to the shape into which the metal extrusion has been bent, can be deposited by means of the lip into the slot in the extrusion. The flange on the extrusion adjacent the slot can then be bent over the plate to securely clamp the two members together. The product so formed can be used as a top or side in various articles of manufacture such as a table top, a box, a building panel, a door, a radiator cover, a sign letter or the like.

Accordingly, it is the primary object of this invention to disclose a novel metal extrusion which can be used in the assembly of various articles of manufacture as well as a novel method of assembly using this extrusion.

Another object of this invention resides in a specific method of assembling an article of manufacture which includes bending an extrusion having a slot and a flange forming a continuation of a wall of a slot into a shape corresponding to the geometric configuration of the article to be formed and bending the flange over a plate deposited within the slot to fabricate a top or side of an article.

Yet another object of this invention resides in a specific extrusion used in the assembly of an article of manufacture, said extrusion, comprising an elongated channel including a pair of flanges joined by a web and a slot cut in one of the flanges, the web including a contiguous extension forming a wall of the slot which may be bent for securely locking a panel or plate to the extrusion whereby the resulting structure can be used as a component of the finished article.

A further object of this invention resides in the fact that the method to be hereinafter disclosed is especially useful in the assembly of articles of manufacture which are waterproofed.

A still further object of this invention resides in the fact that the method of assembly is efficient, utilizes a minimum number of components and results in a great saving in the cost of labor and materials.

For the purpose of illustrating the invention, there are shown in the drawings forms which are presently preferred, it being understood, however, that this invention is not limited to the precise arrangements and instrumentalities shown.

FIGURE 1 is a perspective view of a portion of the extrusion used in the instant invention.

FIGURE 2 is a perspective view of a box which can be manufactured using the extrusion and method of assembly of the present invention.

FIGURE 3 is an exploded cross sectional view of the components of the box shown in FIGURE 2.

FIGURE 4 is a cross sectional view taken substantially along the plane indicated by the line 4—4 of FIGURE 2.

FIGURE 5 is a perspective view of another article which may be formed using the concepts of the present invention and more specifically illustrates a table formed by the method of the present invention.

Referring now to the drawing in detail, a metal extrusion generally designated by the numeral 10 is used in the present invention in the assembly of various articles of manufacture. The extrusion 10 is channel shaped in cross section and includes a web 12 and a pair of flanges 16 and 20 joined to opposite ends of the web.

An elongated slot 22 is formed in the flange 16. The portion of the flange 16 designated by the numeral 18 immediately below the slot 22 is thickened to strengthen the channel.

The web 12 includes a contiguous extension 14 forming a wall of the slot 22. The extension 14 is of a greater length than the depth of the slot. Further, the extension 14 is of a lesser thickness than the web 12 whereby the extension is weakened and susceptible to bending.

The flange 20 of the extrusion 10 is formed with a dovetailed groove 24. The groove 24 is adapted to receive a flexible strip of easily deformable material 25. The strip of material 25 is adapted to form a seal when an article of manufacture is assembled in finished form.

Referring now to FIGURES 2 to 4, the method of assembling an article of manufacture is illustrated in conjunction with the formation of a box 31. In assembling the box 31, a plate 26 is used which has a transversely extending lip 29 about its periphery. If desired, the box may be waterproofed. This is readily accomplished by laminating a pair of water repelling sheet material elements such as 28 and 30 conforming to the shape of the plate 26 to either side of the plate.

Extrusion 10 is first bent into a shape corresponding to the geometric configuration of the laminated plates. Then the lip 29 is deposited into the slot 22 in the extrusion. It is then only necessary to bend the flange 14 on the extrusion approximately 90° over the laminated plate to firmly secure the plate to the extrusion.

That is, the laminated plates are clamped between the extension 14 and the flange 16. If desired, the extension 14 may be cemented to the laminated plates to insure an integral structure. The cement may be any suitable adhesive such as an epoxy.

The box structure 31 may be completed by forming a second panel in the same manner as described above. These panels may be placed so that the grooves 24 are in alignment. A top hinge plate 34 may be fastened by rivets 35 or the like to the web of the top channel. Similarly, a lower hinge plate 32 may be fastened to the lower panel. The plates 32 and 34 may be hinged together by a hinge as shown at 36. The plates 32 and 34 not only enable the panels to pivot with respect to each other but also serve the function of fastening the ends of each extrusion used in the box together.

To complete the assembly, the flexible material 25 may be positioned in one of the dovetailed slots 24 whereby an effective seal between the extrusions is maintained since when the box is closed, the lower portion of the flexible material 25 will enter the groove 24 in the lower extrusion.

Although the invention has been disclosed in conjunction with the formation of a box, it should be appreciated that other articles may be manufactured using the method and extrusion disclosed in this invention. For example, in FIGURE 5, a table top generally designated by the numeral 40 may be formed using one panel assembled in the manner described above. Also, other building panels, doors, radiator covers and even sign letters may be constructed by the present method and extrusion.

The present invention may be embodied in other specific forms without departing from the spirit or essential attributes thereon and, accordingly, reference should be made to the appended claims, rather than to the foregoing specification as indicating the scope of the invention.

We claim:

1. An extrusion for use in the assembly of an article of manufacture comprising an elongated channel including a pair of flanges joined by a web, only a single narrow slot in one of the flanges, said web including a contiguous extension forming a wall of said narrow slot, said extension being substantially longer than the depth of said narrow slot, said extension being of a lesser thickness than said web so that said extension is weakened and susceptible to bending, said flange being thickened beneath said narrow slot to strengthen said channel, said other flange including only a single dovetailed slot, said dovetailed slot adapted to cooperate with a flexible material for providing a seal, the width of said dovetailed slot comprising approximately half of the width of said other flange, the width of said dovetailed slot being substantially greater than the width of said narrow slot.

2. An extrusion as claimed in claim 1 including a flexible material for providing a seal frictionally retained in said dovetailed slot and partially projecting out of said slot and wherein the center line of said narrow slot is between the plane defined by said web and the center line of said dovetailed slot.

References Cited by the Examiner

UNITED STATES PATENTS

| | | | |
|---|---|---|---|
| Re. 24,558 | 10/1958 | Tyree | 52—620 |
| 2,796,959 | 6/1957 | Toney | 52—620 X |

RICHARD W. COOKE, JR., *Primary Examiner.*